No. 614,469. Patented Nov. 22, 1898.
A. J. HARRINGTON & R. S. WARNOCK.
CULTIVATOR.
(Application filed Dec. 7, 1897.)
(No Model.)
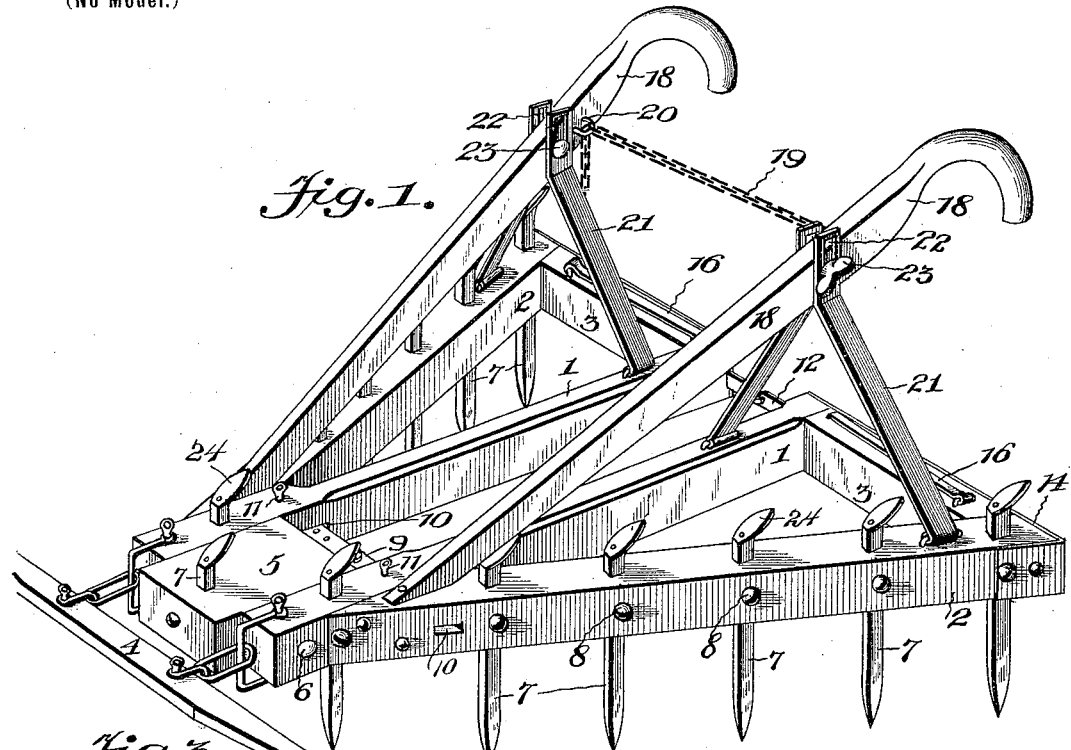
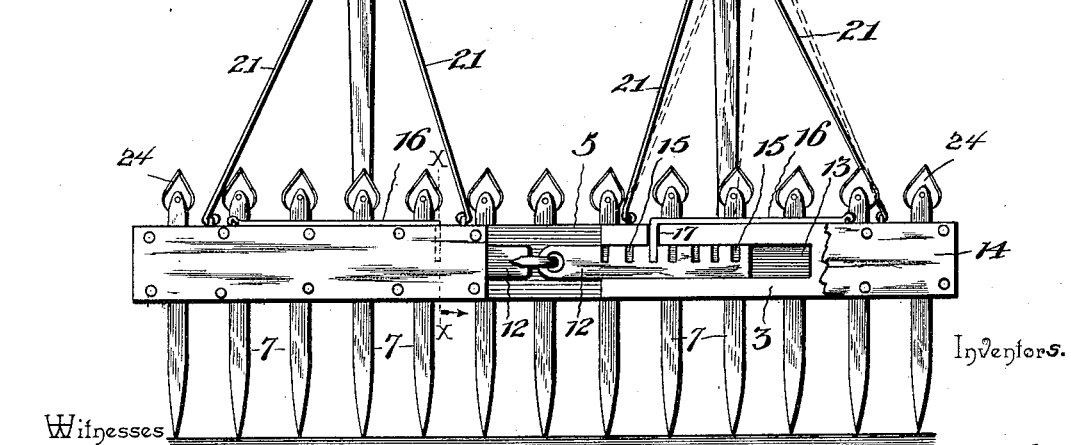
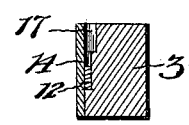
Witnesses
Inventors
Andrew J. Harrington,
Robert S. Warnock.
By their Attorneys,
C. A. Snow & Co.

UNITED STATES PATENT OFFICE.

ANDREW JACKSON HARRINGTON AND ROBERT S. WARNOCK, OF MAGNOLIA, ARKANSAS.

CULTIVATOR.

SPECIFICATION forming part of Letters Patent No. 614,469, dated November 22, 1898.

Application filed December 7, 1897. Serial No. 661,082. (No model.)

*To all whom it may concern:*

Be it known that we, ANDREW JACKSON HARRINGTON and ROBERT S. WARNOCK, citizens of the United States, residing at Magnolia, in the county of Columbia and State of Arkansas, have invented a new and useful Cultivator, of which the following is a specification.

Agricultural implements designed for cultivating are generally constructed with a view to increase or decrease their width, so as to adapt them for varying distances between rows of plants.

One of the principal features of the present invention is to provide connections which will admit of the cultivator-sections moving independently and being adjusted to a greater or less distance apart and which connections will be effective for the purpose and easy of manipulation, so as to enable the desired adjustment being quickly and readily effected.

A further purpose of the invention is to combine with the cultivator-sections adjustable braces for staying the handles and admitting of the latter being shifted so as to vary the distance between them to have the handles within convenient reach when the sections are moved apart.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a cultivator embodying the features of this invention. Fig. 2 is a rear view, parts being broken away and the dotted lines showing an adjusted position of one of the handles. Fig. 3 is a transverse section of the front portion of the cultivator, showing the means for adjustably connecting the sections together. Fig. 4 is a detail section of the rear bar of a cultivator-section on the line X X of Fig. 2, looking to the right, as shown by the arrow.

Corresponding and like parts are referred to in the following description and indicated in the several views of the drawings by the same reference characters.

The cultivator-sections are of like formation and comprise longitudinal bars 1, rearwardly-divergent bars 2, and transverse bars 3, the latter connecting the rear ends of the bars 1 and 2. The draft-bar 4 is shackled to clevises at the front ends of the cultivator-sections in the ordinary manner and the draft for drawing the implement over the field is applied thereto. A filling-block 5 is secured between the front ends of the sections by means of a transverse pin or bolt 6 and has a vertical opening, in which is reversibly fitted a combined cultivator and harrow-tooth. The inclined bars 2 and the front ends of the bars 1 have vertical openings, in which are secured reversible teeth 7, which are held in place in an adjusted position by binding-screws 8. The teeth 7 are pointed at one end, thereby adapting the implement to be used as a harrow, and have shovel-points at the opposite end, so that the implement can be used for cultivating when required.

The sections are adjustably connected at their front and rear ends, at their front ends by plates 9, flexibly connected at their inner ends and having their outer ends passing loosely through slots or openings 10, extending transversely through the front ends of the bars 1 and 2 and having a series of openings through which pins or bolts 11 pass to hold the plates and the sections connected thereby in any adjusted position. The pins or bolts 11 fit loosely in vertical openings of the bars 1 and which intersect with the slots 10, whereby they may pass through any one of the openings in the plates 9 to hold the front ends of the sections at any adjusted distance apart.

The rear ends of the sections are adjustably connected by plates 12, which are pivoted or flexibly connected at their inner ends and are slidable at their outer ends in grooves 13, formed in the rear sides of the bars 3. The rear sides of the grooves 13 are closed by strap-irons 14, secured to the rear faces of the bars 3 and to the rear ends of the bars 1 and 2, and these irons serve to connect the rear ends of the bars 1 and 2 to the bars 3 and to retain the plates 12 in position. These plates 12 are formed with a series of notches 15 in their upper edges, and catches 16, applied to the top side of the bars 3, have their bent ends extending through notches 17, communicating with the grooves 13 and engaging with the notches 15, so as to hold the plates 12 and the rear ends of the sections at any desired distance apart.

The handles 18 have pivotal connection at their front ends with the front portion of the cultivator-sections, so that their rear ends can be moved laterally to bring them to a greater or less distance apart. A chain or like flexible connection 19 connects the rear ends of the handles and prevents them separating when properly adjusted. One end of the chain is secured permanently to one of the handles and the opposite end has adjustable connection with a hook 20, applied to the other handle, the links being engaged with the said hook after the handles have been adjusted to the required distance apart. Each handle is strengthened by braces 21, which have loose connection at their lower ends with the bars 1 and 2 and have their upper ends longitudinally slotted, as at 22, through which passes a bolt 23, whereby the upper ends of the braces are adapted to have independent adjustable connection with the handle. By loosening the bolt 23 the handle can be moved laterally either to the right or to the left, the slots 22 permitting the braces to adapt themselves to the various adjustments of the handle, as indicated by the dotted lines in Fig. 2. After the handle has been adjusted it is secured by retightening the bolt 23, as will be readily understood.

The shovel or plow points 24, applied to the teeth 7, are removable, so as to be replaced by others of different style and make, according to the nature of the work to be performed and the character of the soil, and if the implement is to be rigid the bars or plates connecting the sections will be in one piece and not flexibly or pivotally joined.

Having thus described the invention, what is claimed as new is—

1. In an agricultural implement, the combination of handles applied to the implement and adapted to be adjusted independently at their rear ends to a greater or less distance apart, and a chain or like part adjustably connecting the rear ends of the handles and bracing them laterally, substantially as set forth.

2. In an agricultural implement, the combination of a handle applied to the implement and movable laterally at its rear end, braces between the implement and handle, and means for adjustably connecting the upper ends of the braces with the handle in any one of its lateral adjustments, substantially as and for the purpose set forth.

3. In an agricultural implement, the combination of a handle applied to the implement and movable laterally at its rear end, braces having loose connection at their lower ends with the implement, and having their upper ends slotted, and a bolt independently adjustably connecting the upper ends of the braces with the handle, substantially as described.

4. The combination of a sectional implement, plates pivotally or flexibly connected at a point intermediate the sections and slidably mounted in seats or openings of the sections, and having a series of notches, and catches therefor carried by the sections and adapted to engage with the notches of the respective plates, whereby the sections may be held in a relatively-adjusted position and permit of an independent movement thereof, substantially as set forth.

5. In combination, a sectional implement, plates pivotally connected and operating in transverse openings at the front ends of the sections, and formed with a series of openings in their length, pins for holding the plates and sections in an adjusted position, a second set of plates pivotally connected and slidably mounted in grooves at the rear ends of the sections, and having notched edges, strap-irons closing the open sides of the grooves and retaining the plates in position, and catches for engaging with the notched edges of the plates and holding them and the sections in an adjusted position, substantially as set forth.

In testimony that we claim the foregoing as our own we have hereto affixed our signatures in the presence of two witnesses.

ANDREW JACKSON HARRINGTON.
ROBERT S. WARNOCK.

Witnesses:
THOS. J. WESSON,
C. C. LYLE.